US011065978B2

United States Patent
Aykol et al.

(10) Patent No.: US 11,065,978 B2
(45) Date of Patent: Jul. 20, 2021

(54) SYSTEMS, METHODS, AND STORAGE MEDIA FOR ADAPTING MACHINE LEARNING MODELS FOR OPTIMIZING PERFORMANCE OF A BATTERY PACK

(71) Applicant: TOYOTA RESEARCH INSTITUTE, INC., Los Altos, CA (US)

(72) Inventors: Muratahan Aykol, Santa Clara, CA (US); Patrick K. Herring, Mountain View, CA (US); Abraham Anapolsky, San Mateo, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 221 days.

(21) Appl. No.: 16/284,515

(22) Filed: Feb. 25, 2019

(65) Prior Publication Data
US 2020/0269722 A1 Aug. 27, 2020

(51) Int. Cl.
*B60L 58/18* (2019.01)
*G05B 13/04* (2006.01)
*G05B 13/02* (2006.01)

(52) U.S. Cl.
CPC .......... *B60L 58/18* (2019.02); *G05B 13/0265* (2013.01); *G05B 13/048* (2013.01); *B60Y 2200/91* (2013.01); *B60Y 2200/92* (2013.01)

(58) Field of Classification Search
CPC ........ B60L 58/18; G05B 13/02; G05B 13/04; G05B 13/048; G05B 13/0265;
(Continued)

(56) References Cited

U.S. PATENT DOCUMENTS 9,557,387 B2 1/2017 Bulur et al.
2011/0112781 A1* 5/2011 Anderson ............ G01R 31/392
702/63

(Continued)

FOREIGN PATENT DOCUMENTS

CN 103035961 4/2013
CN 105974327 9/2016
(Continued)

OTHER PUBLICATIONS

Kim, Taesic et al. "Cloud-based battery condition monitoring and fault diagnosis platform for large-scale lithium-ion battery energy storage systems." Department of Electrical Engineering and Computer Science, Texas A&M University, Jan. 4, 2018, http://www.mdpi.com/1996-1073/11/1/125/pdf. Accessed Feb. 25, 2019.
(Continued)

*Primary Examiner* — Tan Q Nguyen
(74) *Attorney, Agent, or Firm* — Dinsmore & Shohl LLP

(57) ABSTRACT

Systems, methods, and storage media for optimizing performance of a vehicle battery pack are disclosed. A method includes receiving data pertaining to cells within a battery pack installed in each vehicle of a fleet of vehicles, the data received from at least one of each vehicle, providing the data to a machine learning server, and directing the machine learning server to generate a predictive model. The predictive model is based on machine learning of the data. The method further includes providing the predictive model to each vehicle, the predictive model providing instructions for adjusting configuration parameters for each of the cells in the battery pack such that the battery pack is optimized for a particular use, and directing each vehicle to optimize performance of the vehicle battery pack based on the predictive model.

20 Claims, 6 Drawing Sheets

(58) Field of Classification Search
CPC .... G01R 31/36; G01R 31/367; G01R 31/396; G07C 5/0816; G07C 5/00; G07C 5/008
See application file for complete search history.

(56) References Cited

U.S. PATENT DOCUMENTS

| | | | | |
|---|---|---|---|---|
| 2016/0195587 A1* | 7/2016 | Lee | ............... | G01R 31/392 |
| | | | | 702/63 |
| 2016/0239759 A1* | 8/2016 | Sung | ............... | G06N 20/00 |
| 2016/0349330 A1* | 12/2016 | Barfield, Jr. | ............... | G07C 5/008 |
| 2017/0288399 A1* | 10/2017 | Fife | ............... | G06Q 10/06315 |
| 2018/0095140 A1* | 4/2018 | Park | ............... | G01R 31/378 |
| 2018/0143257 A1* | 5/2018 | Garcia | ............... | G05B 23/0283 |
| 2019/0392320 A1* | 12/2019 | Kim | ............... | B60L 3/12 |
| 2020/0074297 A1* | 3/2020 | Lee | ............... | G06N 3/006 |
| 2020/0096572 A1* | 3/2020 | You | ............... | G06N 3/08 |
| 2020/0164763 A1* | 5/2020 | Holme | ............... | B60L 58/10 |

FOREIGN PATENT DOCUMENTS

| | | |
|---|---|---|
| CN | 106528951 | 3/2017 |
| CN | 106671785 | 5/2017 |
| CN | 105137358 | 6/2018 |
| CN | 108258338 | 7/2018 |

OTHER PUBLICATIONS

Dekong, Zeng. "Statistical methods for enhanced metrology in semiconductor/photovoltaic manufacturing." Electrical Engineering and Computer Sciences University of California at Berkeley, Dec. 12, 2012, http://digitalassets.lib.berkeley.edu/techreports/ucb/text/EECS-2012-237.pdf. Acessed Feb. 25, 2019.

* cited by examiner

SYSTEMS, METHODS, AND STORAGE MEDIA FOR ADAPTING MACHINE LEARNING MODELS FOR OPTIMIZING PERFORMANCE OF A BATTERY PACK

BACKGROUND

Field

The present specification generally relates to generation of a battery pack predictive model and, more particularly, to systems, methods, and storage media for using machine learning to generate a predictive model that is usable to optimize battery performance of a battery installed in a vehicle.

Technical Background

Currently driven vehicles may have battery packs installed therein that are programmed to optimize function (e.g., maximize performance, maximize life, maximize charge length, minimize charging time, avoid damage, or the like) by adjusting parameters such as charge, discharge, state, and/or the like. In addition, newly manufactured battery packs may also be configured to adjust parameters to optimize function. However, in some cases, these programming instructions are not updatable. As battery degradation occurs over the lifespan of the battery pack, the inability to update the parameters to maximize future battery function may adversely affect the performance of the battery pack, the life of the battery pack, charging times of the battery pack, discharging times of the battery pack, and/or the like.

SUMMARY

One aspect of the present disclosure relates to a method of optimizing performance of a vehicle battery pack that includes receiving, by a processing device, data pertaining to cells within a battery pack installed in each vehicle of a fleet of vehicles, the data received from at least one of each vehicle in the fleet of vehicles, providing, by the processing device, the data to a machine learning server, directing, by the processing device, the machine learning server to generate a predictive model, the predictive model based on machine learning of the data, providing, by the processing device, the predictive model to each vehicle in the fleet of vehicles, the predictive model providing instructions for adjusting one or more configuration parameters for each of the cells in the battery pack such that the battery pack is optimized for a particular use, and directing, by the processing device, each vehicle in the fleet of vehicles to optimize performance of the vehicle battery pack based on the predictive model.

Another aspect of the present disclosure relates to a system configured for optimizing performance of a vehicle battery pack that includes a fleet of vehicles, each vehicle in the fleet of vehicles including a battery pack having a plurality of cells, and one or more hardware processors communicatively coupled to each vehicle in the fleet of vehicles. The one or more hardware processors are configured by machine-readable instructions to receive data pertaining to cells within a battery pack installed in each vehicle of a fleet of vehicles, the data received from at least one of each vehicle in the fleet of vehicles, provide the data to a machine learning server, and direct the machine learning server to generate a predictive model. The predictive model is based on machine learning of the data. The one or more hardware processors are further configured by machine-readable instructions to provide the predictive model to each vehicle in the fleet of vehicles, the predictive model providing instructions for adjusting one or more configuration parameters for each of the cells in the battery pack such that the battery pack is optimized for a particular use and direct each vehicle in the fleet of vehicles to optimize performance of the vehicle battery pack based on the predictive model.

Yet another aspect of the present disclosure relates to a non-transient computer-readable storage medium having instructions embodied thereon, the instructions being executable by one or more processors to perform a method for optimizing performance of a vehicle battery pack. The method includes receiving data pertaining to cells installed in each vehicle of a fleet of vehicles, the data received from at least one of each vehicle in the fleet of vehicles, providing the data to a machine learning server, and directing the machine learning server to generate a predictive model. The predictive model is based on machine learning of the data. The method further includes providing the predictive model to each vehicle in the fleet of vehicles, the predictive model providing instructions for adjusting one or more configuration parameters for each of the cells in the battery pack such that the battery pack is optimized for a particular use. The method further includes directing each vehicle in the fleet of vehicles to optimize performance of the vehicle battery pack based on the predictive model.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1:
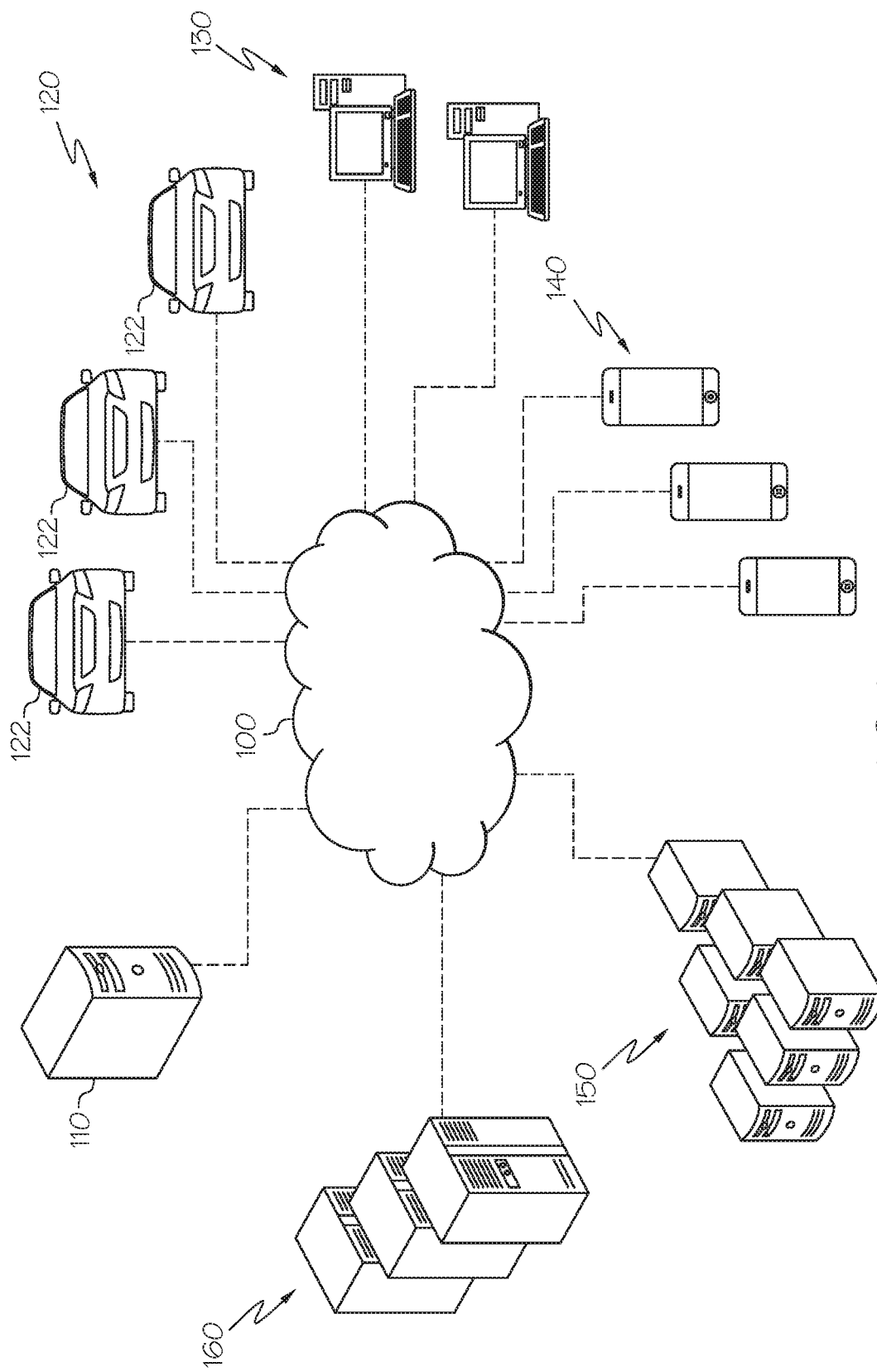
FIG. 1 schematically depicts an illustrative network of devices and systems for continuously optimizing performance of a battery pack according to one or more embodiments shown and described herein.

The present disclosure relates generally to training and using a machine learning (ML) model that is used to continuously optimize performance of a battery pack over an entire lifespan of the battery pack, particularly a battery pack found in vehicles such as electric vehicles (EVs), hybrid gas-electric vehicles, and the like. Training and use of a machine learning model generally includes obtaining data pertaining to operation of the cells in battery packs installed in a fleet of currently-operating vehicles, as well as batteries that are tested using battery testing devices such as high throughput (HT) cyclers. That is, the data used for training is obtained from evaluation of battery packs used in real-world scenarios as well as simulated evaluation of battery discharge from the battery testing devices. The data is then fed into a ML server, which generates a predictive model that is provided to currently operated vehicles and/or manufacturing facilities to optimize future performance of the battery pack therein. The process described herein occurs continuously such that vehicles are constantly optimizing battery pack usage.

Battery packs, particularly those used in vehicles such as EVs and hybrid gas-electric vehicles, consist of an arrangement of cells that contain stored energy. The cells are connected in parallel to form a module, and a plurality of modules are connected in series to form a pack. Some systems and methods merely monitor battery pack operation at a pack level (e.g., the battery pack as a whole). Monitoring in this manner is not sufficiently granular to obtain the data that is necessary for machine learning and generation of a model that can be used for configuring cells and modules within a pack.

When the battery packs are installed in a vehicle, they are generally optimized at the time of installation to maximize performance, such as, for example, to provide sufficient electrical power to vehicle systems to ensure optimum system performance, to maximize the life of the battery pack, to maximize the amount of time that the vehicle can go between charges, to minimize the charging times of the battery pack, and/or the like. However, as the battery pack is routinely used (e.g., when operating the vehicle, thereby discharging the battery and/or when charging the battery), degradation of the battery pack occurs. It may be difficult to determine at the time of installation how precisely degradation may occur (e.g., which cells or modules within a pack are degrading, a rate at which cells are degrading, various vehicle operating conditions that cause particular types of degradation, and/or the like).

Furthermore, systems and methods are not adapted to continuously adjust pack operating parameters (e.g., direct charging/discharging of particular cells, adjust voltage outputs of particular cells, and/or the like) to ensure that a particular configuration of cells within a pack operate optimally after a pack has been installed in a vehicle. Accordingly there exists a need to continuously monitor the functionality of a battery pack (including the cells and modules therein) for the purposes of determining how the battery pack is degrading so that future degradation of the battery pack and/or degradation of other battery packs can be predicted. In addition, there exists a need to provide the battery packs with an ability to continuously update operating parameters to minimize degradation, extend the life of the battery pack, increase pack performance, improve charging and discharging, and/or the like over the life of the pack.

Referring now to the drawings, FIG. 1 depicts an illustrative network, generally designated 100, of devices and systems for continuously optimizing a battery pack for use according to embodiments shown and described herein. As illustrated in FIG. 1, the network 100 may include a wide area network, such as the internet, a local area network (LAN), a mobile communications network, a public service telephone network (PSTN) and/or other network and may be configured to electronically connect a battery configuration system 110, one or more vehicles 122 in a fleet of vehicles 120, one or more user computing devices 130, one or more mobile devices 140, one or more machine learning servers 150, and/or one or more battery testing devices 160.

The battery configuration system 110 is generally a computing device that carries out various processes for determining an optimized configuration for a particular battery pack (including a module thereof) and directs transmits instructions for optimizing battery pack to each battery pack, as described in greater detail herein. The battery configuration system 110 contains one or more hardware components, as will be discussed herein with respect to FIGS. 3A and 3B.

Still referring to FIG. 1, the fleet of vehicles 120 includes one or more vehicles 122, each of which has at least one battery pack therein. For example, each vehicle 122 in the fleet of vehicles 120 may be an electric vehicle, a gas-electric hybrid vehicle, or the like. Each vehicle 122 in the fleet of vehicles 120 can be communicatively coupled to any of the components within the network 100 to transmit data corresponding to the battery pack, and can further receive instructions for utilizing the battery pack therein, as described in greater detail herein. Accordingly, each vehicle 122 in the fleet of vehicles 120 includes one or more hardware components that are used for generating data, communicating data, receiving commands, and executing commands, as described herein with respect to FIG. 4.

Still referring to FIG. 1, the one or more user computing devices 130 and the one or more mobile devices 140 may generally be devices that are used by a user to transmit information from at least one vehicle 122 in the fleet of vehicles 120 (if the vehicle within the fleet of vehicle is not directly coupled to the network 100) and/or receive information from the battery configuration system 110 (e.g., directions). For example, the one or more user computing devices 130 and/or the one or more mobile devices 140 may be communicatively coupled to a vehicle 122 from the fleet of vehicles 120 to receive data from the vehicle (e.g., via the vehicle's on-board diagnostics (OBD) port) and transmit the data via the network 100 to another device (e.g., the battery configuration system 110). In another example, the one or more user computing devices 130 and/or the one or more mobile devices 140 may be integrated with an electric vehicle charging station such that, when the vehicle 122 is connected to the charging station for a charge, a data connection is created between the vehicle 122 and the charging station (e.g., at least one of the user computing device 130 and the mobile device 140) such that data can be transmitted to one or more other components connected to the network 100 via the charging station. In yet another example, the one or more user computing devices 130 and/or the one or more mobile devices 140 may be located in a vehicle repair facility, vehicle dealership, and/or the like. In yet another example, the one or more user computing devices 130 and/or the one or more mobile devices 140 may be located in a battery manufacturing facility, and may receive instructions that are either displayed to a person assembling a battery pack or provided to a robot assembling a battery pack. The instructions may direct the user or the robot to pick certain cells exhibiting characteristics, place the cells in a particular location or in a particular relation to other cells or other battery components (e.g., sensors, cooling devices, or the like), bend the cells in a particular manner, modify programming for various pack control systems, and/or the like. Each of the one or more user computing devices 130 may generally be any computing device that includes components that allow the device to perform any user-facing functions (e.g., a display, a user input device, memory, processing device, communications ports, and/or the like), and is otherwise not limited by the present disclosure. Similarly, each of the one or more mobile devices 140 may generally be any computing device that includes components that allow the device to perform any user-facing functions (e.g., a display, a user input device, memory, processing device, communications ports, and/or the like), and is otherwise not limited by the present disclosure.

In some embodiments, the one or more mobile devices 140 may be a user's smartphone or the like that is communicatively coupled to a vehicle 122 (e.g., via Bluetooth connection or the like), whereby the data connection provided by the user's smartphone is usable to transmit data from the vehicle 122 to one or more other components coupled to the network 100.

The one or more machine learning servers 150 are generally computing devices that store one or more machine learning algorithms thereon and are particularly configured to receive data pertaining to the cells in batteries and generate a model therefrom, the model being useable by the battery configuration system 110 and/or the vehicles 122 to estimate various battery operating parameters and update battery operating parameters to optimize battery function and battery life, as described in greater detail herein. The machine learning algorithms utilized by the one or more machine learning servers 150 are not limited by the present disclosure, and may generally be any algorithm now known or later developed, particularly those that are specifically adapted for continuously determining an optimized battery pack function based on a particular use, the age of the battery pack, and/or the like, and predicting particular pack settings to ensure optimum pack use in the future. That is, the machine learning algorithms may be supervised learning algorithms, unsupervised learning algorithms, semi-supervised learning algorithms, and reinforcement learning algorithms. Specific examples of machine learning algorithms may include, but are not limited to, nearest neighbor algorithms, naïve Bayes algorithms, decision tree algorithms, linear regression algorithms, supervised vector machines, neural networks, clustering algorithms, association rule learning algorithms, Q-learning algorithms, temporal difference algorithms, and deep adversarial networks. One specific algorithm may be a descriptor based algorithm that analyzes a capacity-voltage (C-V) curve for individual cell cycles, extracting a particular feature within the curve, then using the particular feature to quantify the feature and predict the lifetime of the battery pack therefrom. Another specific algorithm may be a long short-term memory (LSTM) neural network that uses a larger dataset than the descriptor-based algorithm described hereinabove. Other specific examples of machine learning algorithms used by the one or more machine learning servers 150 should generally be understood and are included within the scope of the present disclosure.

The one or more battery testing devices 160 are generally devices that are used to test batteries, generate data corresponding to the battery testing, and supply the data to one or more components communicatively coupled thereto via the network 100 (e.g., the battery configuration system 110). The battery testing devices 160 may generally test batteries or components thereof (e.g., modules, cells, or the like) that are not installed in vehicles (i.e., not contained within one of the vehicles 122). The battery testing devices 160 may test a battery or component thereof for charge, voltage, discharge rate, charging time, life span, physical characteristics, chemical composition, cranking amps, internal battery management systems functionality, and/or the like. The battery testing devices 160 may also simulate various discharge conditions. For example, the battery testing devices 160 may complete an EV Drive Cycle Simulation (e.g., Federal Urban Drive Schedule—FUDS), a Hybrid Pulse Power Characterization (HPPC) test, and/or the like. In embodiments with respect to testing of individual cells, the battery testing devices 160 may be used for electrochemistry, battery, and supercapacitor testing, HPCE measurements, electrochemical research and development, half-cell testing, life cycle testing, electrochemical impedance spectroscopy (EIS), and/or the like. In some embodiments, at least one of the battery testing devices 160 may be a high-throughput (HT) cycler. An illustrative example of one of the battery testing devices 160 is the 9220 Dual Bay Series Low Voltage/High Current Cycler available from NH Research (Irvine, Calif.). Another illustrative example of one of the battery testing devices 160 is the various battery testing products available from Arbin Instruments (College Station, Tex.), such as, for example, the Regenerative Battery Testing (RBT) series of devices.

It should be understood that while the user computing device 130 is depicted in FIG. 1 as a personal computer and the battery configuration system 110 and the one or more machine learning servers 150 are depicted as servers, these are nonlimiting examples. More specifically, in some embodiments, any type of computing device (e.g., mobile computing device, personal computer, server, etc.) may be utilized for any of these components. Additionally, while each of these computing devices is illustrated in FIG. 1 as a single piece of hardware, this is also merely an example. More specifically, each of the battery configuration system 110, the one or more user computing devices 130, the one or more mobile devices 140, and/or the one or more machine learning servers 150 may represent a plurality of computers, servers, databases, or the like.

Figure 2:
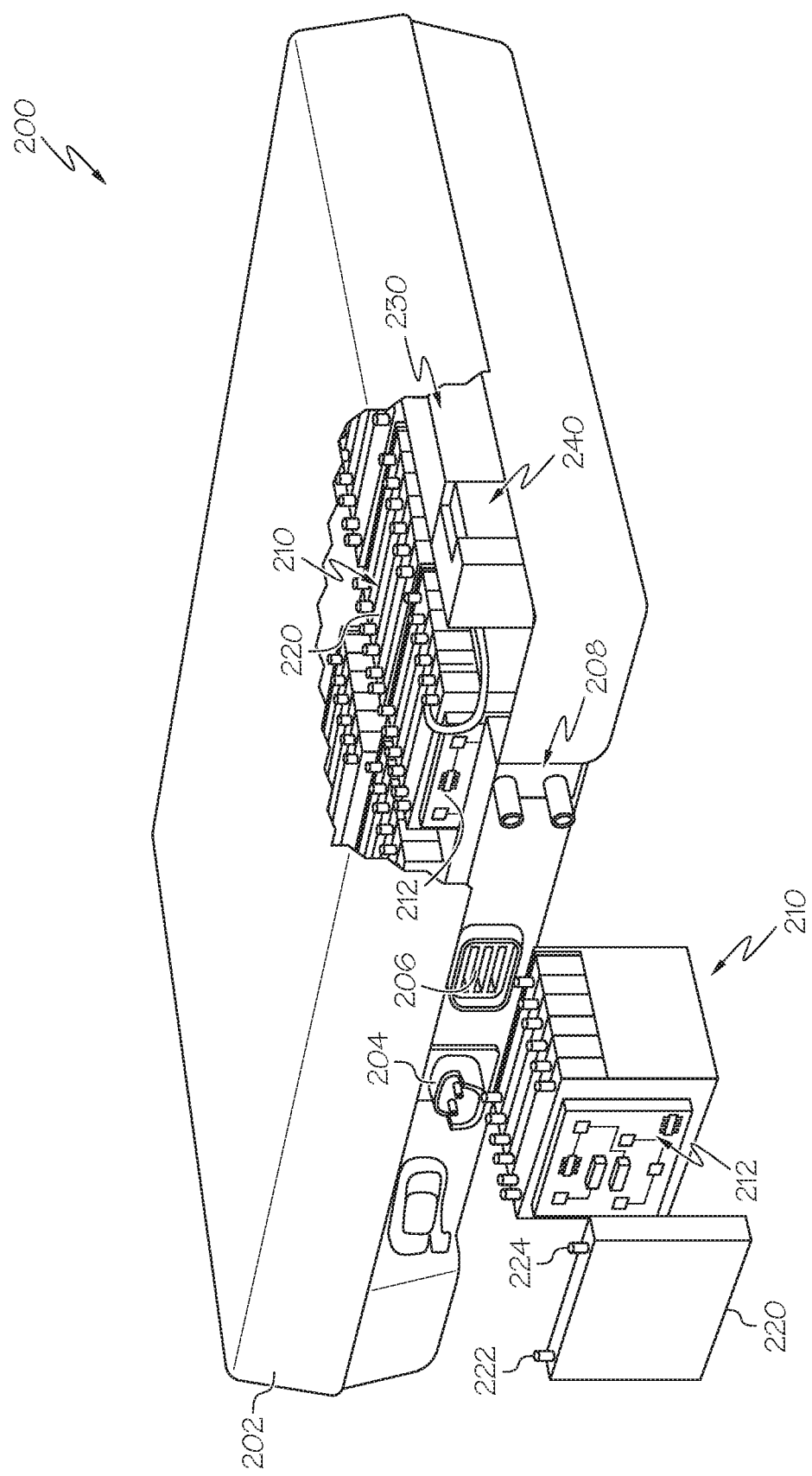
FIG. 2 schematically depicts a perspective view of an illustrative cell, an illustrative module, and an illustrative battery pack having a plurality of cells arranged within a plurality of modules according to one or more embodiments shown and described herein.

FIG. 2 depicts a perspective view of a battery pack 200 containing a plurality of cells 220 arranged within modules 210 therein. FIG. 2 further depicts an illustrative cell 220 and a module 210 that includes a plurality of cells 220 therein. The battery pack 200 depicted in FIG. 2 is an illustrative example of a pack that may be found in a vehicle, such as a vehicle 122 in the fleet of vehicles 120 (FIG. 1). That is, the battery pack 200 may be an energy storage device that is used to power various vehicle components in a vehicle, particularly electric vehicle components, gas-electric hybrid vehicle components, and/or the like. The battery pack 200 depicted in FIG. 2 may also be an illustrative example of a pack that is tested by the one or more battery testing devices 160 (FIG. 1).

Still referring to FIG. 2, in some embodiments, the battery pack 200 may be shaped and/or sized to correspond to a vehicle in which it is installed, and may be configured to house a plurality of the cells 220 and/or the modules 210 therein. The battery pack 200 may include a cover that defines an interior in which the cells 220 and/or modules 210 are contained, along with various other components such as (but not limited to) pack sensor hardware 230 having one or more sensors and/or one or more battery management system (BMS) hardware components 240.

Each of the cells 220 within a module 210 of the battery pack 200 may generally be a battery cell that is used for storing electrical energy that is provided to an external component, such as a component of a vehicle. As such, each of the cells 220 may have a plurality of terminals thereon, including a positive terminal 222 and a negative terminal 224. The cell 220 is otherwise not limited by the present disclosure, and may be any type of battery cell now known or later developed. Illustrative examples of cells include, but are not limited to, lead acid cells, nickel metal hydride (NiMH) cells, lithium ion (Li-ion) cells, and/or the like.

Each of the cells 220 may be any size and/or shape and/or moldable into any size or shape. As such, the present disclosure is not limited to any particular size and shape. Moreover, the modules 210 within the battery pack 200 may have a plurality of cells 220 that have different sizes and shapes. That is, a module 210 may include one or more first cells 220 having a first size and/or shape and one or more second cells 220 having a second size and/or shape that is different from the first size and/or shape. Use of differently shaped cells 220 within a module 210 in various arrangements may allow for the module 210 to be configured in various manners. For example, the module 210 may be molded to fit a particular shape based on the location of that module 210 within the battery pack 200 (e.g., to fit a particularly shaped void, to fit in between particularly shaped components, and/or the like), and the module 210 may be filled with cells 220 having various sizes so as to maximize the number of cells 220 located within the module 210, maximize the amount of energy storage capacity of the module 210, and/or the like. In addition, modules 210 may be subsequently molded and filled with particular cells 220 and/or particular arrangement of cells 220 based on a direction received from the battery configuration system 110 (FIG. 1), as described in greater detail herein. Accordingly, it should be understood that the shape and size of the modules 210 and the cells 220 are not limited by the present disclosure.

In some embodiments, each of the modules 210 may also include a module BMS device 212. The module BMS device 212 may generally be a battery management system that is particularly adapted for the module 210 in which it is located to manage electrical output of the module 210 and/or the cells 220 thereof, manage charging of the module 210 and/or the cells 220 thereof, collect data on a charge and/or a discharge of the module 210 and/or the cells 220, transmit collected data, and/or the like. It should be understood that the module BMS device 212 may receive programming instructions and may modify operation of the cells 220 within the module 210 according to the programming instructions, as described in greater detail herein.

The pack sensor hardware 230 located within the battery pack 200 may generally sense one or more characteristics of the battery pack 200, the modules 210 therein, the cells 220 therein, and/or one or more other components therein. For example, the pack sensor hardware 230 may include a temperature sensor configured to sense an internal temperature of the battery pack 200 as a whole, or various portions of the battery pack 200 (e.g., to identify "hot spots" within the battery pack 200). That is, temperature sensors may be dispersed throughout the interior of the battery pack 200 to sense the temperature at particular areas within the battery pack 200. In another example, the pack sensor hardware 230 may include an electrical meter configured to sense one or more electrical characteristics of the modules 210 and/or the cells 220 within the battery pack 200, such as, but not limited to, voltage, impedance, and/or the like. In some embodiments, the pack sensor hardware 230 may be integrated with the module BMS device 212 of each of the modules 210 such that sensing on a cell level or a module level can be achieved. In some embodiments, the pack sensor hardware 230 may be integrated with the BMS hardware components 240. The pack sensor hardware 230 may be communicatively coupled to one or more devices to transmit data corresponding to the sensed characteristics such that the data can be utilized as described herein. For example, the pack sensor hardware 230 may be communicatively coupled to the BMS hardware components 240, which provides the data to one or more external components such as, but not limited to, the battery configuration system 110 (FIG. 1).

Still referring to FIG. 2, the BMS hardware components 240 are generally any electronic system components that are configured to manage the modules 210 and the cells 220 of the battery pack 200, including components that are now known or later developed. As such, the BMS hardware components 240 may generally include components that are particularly configured for maintaining operation of the battery pack 200, monitoring a state of the battery pack 200 (as well as the modules 210 and cells 220 therein), calculating secondary data, transmitting calculated data and/or data received from the pack sensor hardware 230, maintaining the operating environment within the battery pack 200, authenticating the battery pack 200, and/or balancing the battery pack 200.

In some embodiments, the BMS hardware components 240, in conjunction with the pack sensor hardware 230, may monitor and/or control various battery operating parameters of the battery pack 200, the modules 210 thereof, and/or the cells 220 thereof. For example, the BMS hardware components 240 may monitor and/or control voltage (e.g., total voltage, voltage of particular modules 210, voltage of particular cells 220, minimum cell voltage, maximum cell voltage, voltage of periodic taps, and/or the like), temperature (e.g., average temperature, coolant intake temperature, coolant output temperature, coolant flow, temperatures of each module 210, temperatures of each cell 220, and/or the like), state of charge (SOC) or depth of discharge (DOD), state of health (SOH), state of power (SOP), (e.g., current in or out of the battery pack 200, the modules 210 thereof, and/or the cells 220 thereof), and/or recharging parameters (e.g., directing recovered energy and/or the like).

In some embodiments, the BMS hardware components 240 may calculate various values, including, but not limited to, maximum charge current as a charge current limit (CCL), maximum discharge current as a discharge current limit (DCL), energy (e.g., kilowatt-hours (kWh)) delivered since last charge or charge cycle, internal impedance of a module 210 and/or a cell 220, open circuit voltage, charge delivered or stored (e.g., Coulomb counter), total energy delivered since first use, total operating time since first use, total number of cycles, and/or the like.

In embodiments, the BMS hardware components 240 may include a central controller that communicates internally within the battery pack 200 with various other hardware, such as for example, hardware associated with a module 210 and/or a cell 220 (e.g., the module BMS device 212) and/or externally with external components, such as, for example, the various components depicted in FIG. 1. Still referring to FIG. 2, the central controller may communicate via a serial connection, a CAN bus, a DC-Bus (e.g., serial over power line), and/or wirelessly.

The BMS hardware components 240 may also be used to optimize usage of the battery pack 200 (e.g., charging the battery pack 200, discharging the battery pack, and/or the like) by wasting energy from the most charged modules 210 and/or cells 220 by connecting the modules 210 and/or cells 220 to a load (e.g., via passive regulators or the like), shuffling energy from relatively more charged modules 210 and/or cells 220 to relatively less charged modules 210 and/or cells, reducing charging currents such that relatively higher charged modules 210 and/or cells 220 are not damaged, but relatively lower charged modules 210 and/or cells 220 can still to charge, modular charging, and/or the like. The BMS hardware components 240 may continuously receive programming instructions (e.g., instructions from the battery configuration system 110 (FIG. 1)) and continuously update the parameters for optimizing usage of the battery pack, as described in greater detail herein. Further, the BMS hardware components 240 may continuously provide data regarding the battery pack usage, thereby creating a feedback loop, as described in greater detail herein.

Still referring to FIG. 2, the topology of the BMS hardware components 240 should generally be understood, and is not limited by the present disclosure. That is, the BMS hardware components 240 may a centralized topology whereby a single controller is coupled to all of the modules 210 and cells 220, a distributed topology whereby a BMS board is installed at each module 210 and/or cell (e.g., the module BMS device 212), or a modular topology whereby the BMS hardware components 240 include a plurality of controllers, each of which handles a subset of the total number of modules 210 and cells 220 within the battery pack 200.

In some embodiments, the battery pack 200 may further include one or more ports for transmitting electricity stored in the cells 220, transmitting data (e.g., from the BMS hardware components 240), and/or the like. For example, as depicted in FIG. 2, the battery pack 200 may include an electrical port 204, a data port 206, and/or an auxiliary port 208.

The electrical port 204 is generally provides an electrical coupling to the various components within the battery pack 200, including, but not limited to, the modules 210 and the cells 220. Thus, the electrical port 204, when electrically coupled to an external device, may allow electrical currents to flow between the battery pack 200 and the external device. As such, the electrical port 204 may be shaped, sized, and arranged to electrically couple to one or more components of a vehicle and/or battery testing device.

The data port 206 generally provides a data connection between the components within the battery pack 200 and one or more external components. That is, data gathered and/or generated by various components within the battery pack 200 (e.g., the BMS hardware components 240, each module BMS device 212, data from the pack sensor hardware 230, and/or the like) may be transmitted out of the battery pack 200 via the data port 206 to external components such as (but not limited to), the various components shown and described with respect to FIG. 1. That is, referring also to FIG. 1, the data may be transmitted to the battery configuration system 110, other components of a vehicle 122 in the fleet of vehicles 120, the one or more user computing devices 130, the one or more mobile devices 140, the one or more machine learning servers 150, and/or the one or more battery testing devices 160 via the data port 206. In some embodiments, the data from the components within the battery pack 200 may be transmitted by one device to another device. For example, the data port 206 may be communicatively coupled to a vehicle's CAN bus (or other similar local interface) such that the data from the components within the battery pack 200 are transmitted via the CAN bus where it is retrieved via a connection between the vehicle's CAN bus and another component (e.g., a user computing device 130 or a mobile device connected to the CAN bus via an access port such as the vehicle's OBD port). The data may then be relayed via the network 100 to yet another component such as the battery configuration system 110. In another example, the data port 206 may be communicatively coupled to one or more of the battery testing devices 160 such that data from the components within the battery pack 200 are transmitted to the one or more battery testing devices 160. While the data port 206 is depicted in FIG. 6 as a physical port for a wired connection, this is merely illustrative. In some embodiments, the data port 206 may be a wireless port, such as a wireless communications card or the like.

The auxiliary port 208 may generally be any type of port for any type of communication or electrical coupling. In some embodiments, the auxiliary port 208 may be used for a combination of communications and electrical coupling (e.g., serial communication over powerline).

It should now be understood the type of battery pack that is generally used for the purposes described herein. However, it should also be understood that the battery pack described with respect to FIG. 2 is merely illustrative, and other battery packs now known or later developed may also be used without departing from the scope of the present disclosure.

Figure 3A:
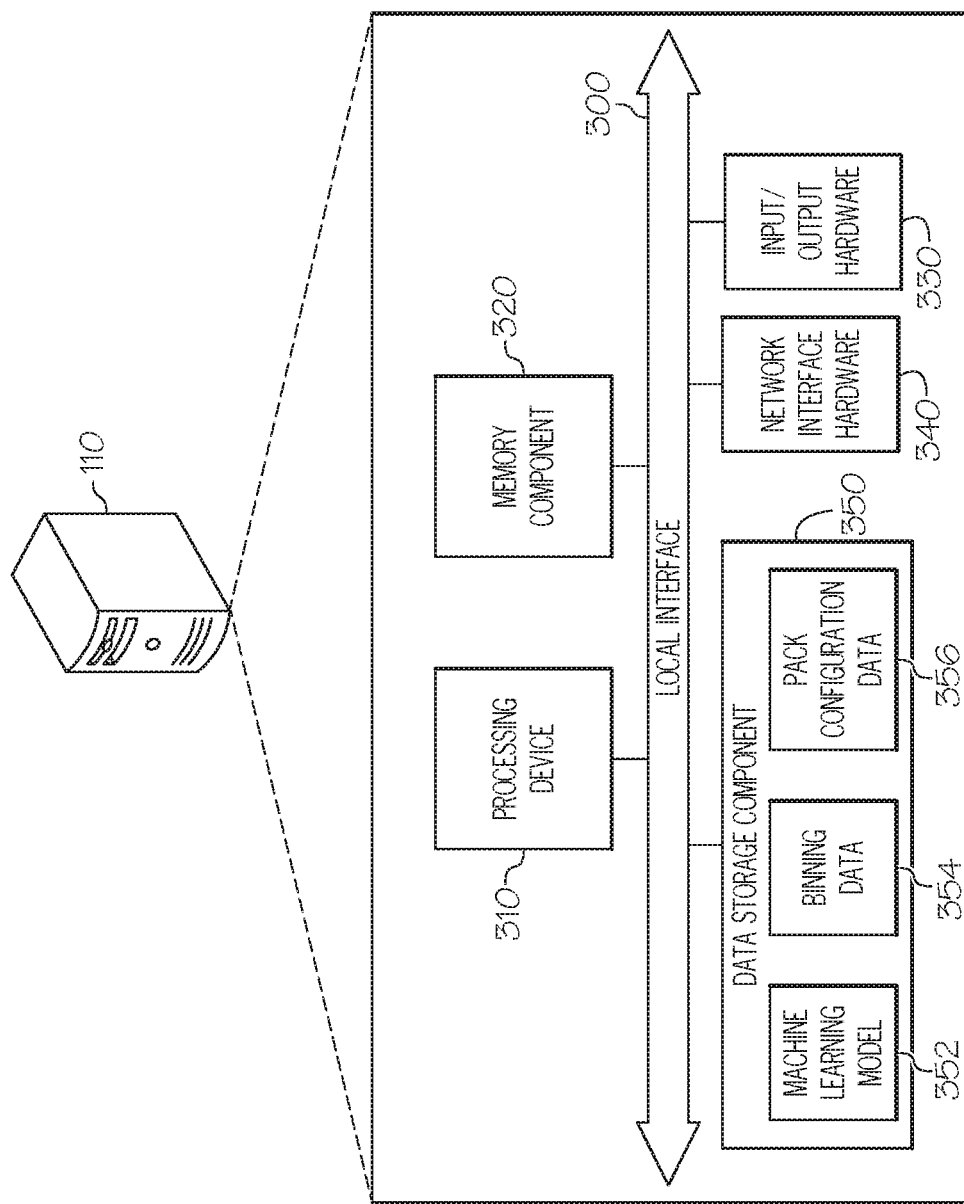
FIG. 3A schematically depicts illustrative hardware components of a battery configuration system that continuously optimizes performance of a battery pack according to one or more embodiments shown and described herein.

FIG. 3A depicts illustrative internal components of the battery configuration system 110 of FIG. 1 that provide the battery configuration system 110 with the capabilities described herein. As depicted in FIG. 3A, the battery configuration system 110 may include a processing device 310, a non-transitory memory component 320, network interface hardware 340, input/output (I/O) hardware 330, and/or a data storage component 350. A local interface 300, such as a bus or the like, may interconnect the various components.

The processing device 310, such as a computer processing unit (CPU), may be the central processing unit of the battery configuration system 110, performing calculations and logic operations to execute a program. The processing device 310, alone or in conjunction with the other components, is an illustrative processing device, computing device, processor, or combination thereof. The processing device 310 may include any processing component configured to receive and execute instructions (such as from the data storage component 350 and/or the memory component 320).

The memory component 320 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 320 may include one or more programming instructions thereon that, when executed by the processing device 310, cause the processing device 310 to complete various processes, such as the processes described herein with respect to FIG. 5.

Figure 3B:
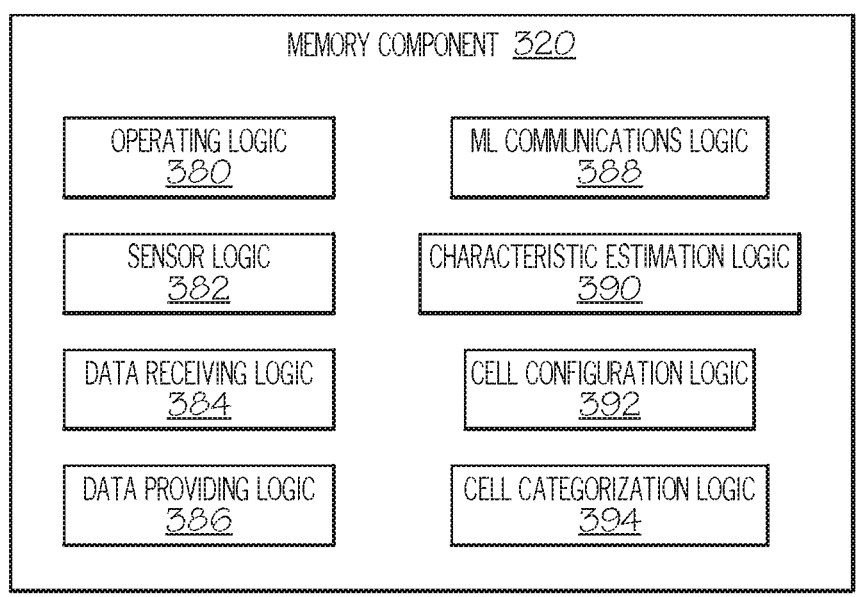
FIG. 3B depicts a block diagram of illustrative logic contained within a memory of a battery configuration system that continuously optimizes performance of a battery pack according to one or more embodiments shown and described herein.

Referring to FIGS. 3A-3B, the programming instructions stored on the memory component 420 may be embodied as a plurality of software logic modules, where each logic module provides programming instructions for completing one or more tasks. Illustrative logic modules depicted in FIG. 3B include, but are not limited to, operating logic 380, sensor logic 382, data receiving logic 384, data providing logic 386, machine learning communications logic 388, characteristic estimation logic 390, cell configuration logic 392, and/or cell categorization logic 394. Each of the logic modules depicted in FIG. 3B may be embodied as a computer program, firmware, or hardware, as an example.

The operating logic 380 may include an operating system and/or other software for managing components of the battery configuration system 110. The sensor logic 382 may include one or more programming instructions for direction operation of one or more sensors, such as sensors included within a vehicle (e.g., one of the fleet of vehicles 120 (FIG. 1)), sensors included within a battery pack 200 (FIG. 2), and/or the like. Referring to FIGS. 1 and 3B, the data receiving logic 384 may generally include programming instructions for receiving data from one or more components external to the battery configuration system 110, such as, for example, data transmitted by any vehicle 122 from the fleet of vehicles 120, the one or more user computing devices 130, the one or more mobile devices 140, the one or more battery testing devices 160, a battery pack 200 (FIG. 2) and/or the like. Still referring to FIGS. 1 and 3B, the data providing logic 386 may generally include programming instructions for transmitting data to one or more components external to the battery configuration system 110, such as, for example, data or programming instructions to any vehicle 122 from the fleet of vehicles 120, the one or more user computing devices 130, the one or more mobile devices 140, the one or more battery testing devices 160, a battery pack 200 (FIG. 2) and/or the like. Still referring to FIGS. 1 and 3B, the machine learning communications logic 388 may generally include programming instructions for communicating with the one or more machine learning servers 150, such as instructions for transmitting data to the one or more machine learning servers 150, transmitting instructions to the one or more machine learning servers 150, receiving data or information from the one or more machine learning servers 150, directing operation of the one or more machine learning servers 150, and/or the like.

Referring to FIGS. 1, 2 and 3B, the characteristic estimation logic 390 may generally include one or more programming instructions for estimating one or more characteristics of the battery pack 200 and/or components therein based on data received from one or more other components, such as, for example, a vehicle 122 from the fleet of vehicles 120, the one or more machine learning servers 150, and/or the one or more battery testing devices 160. The cell configuration logic 392 may generally include one or more programming instructions for determining a configuration of cells 220 and/or modules 210 within a battery pack 200, as described in greater detail herein. The cell categorization logic 394 may generally include one or more programming instructions for categorizing cells 220 based on one or more characteristics of the cells 220 (e.g., binning the cells 220), as described in greater detail herein.

Referring again to FIG. 3A, the input/output hardware 330 may communicate information between the local interface 300 and one or more other components of the battery configuration system 110 not described herein. In some embodiments, the input/output hardware 330 may be used for one or more user interface components, including local user interface components and/or one or more remote user interface components.

The network interface hardware 340 may include any wired or wireless networking hardware, such as a modem, LAN port, wireless fidelity (Wi-Fi) card, WiMax card, mobile communications hardware, and/or other hardware for communicating with other networks and/or devices. For example, the network interface hardware 340 may be used to facilitate communication between the various other components described herein with respect to FIG. 1.

The data storage component 350, which may generally be a storage medium, may contain one or more data repositories for storing data that is received and/or generated. The data storage component 350 may be any physical storage medium, including, but not limited to, a hard disk drive (HDD), memory, removable storage, and/or the like. While the data storage component 350 is depicted as a local device, it should be understood that the data storage component 350 may be a remote storage device, such as, for example, a server computing device, cloud based storage device, or the like. Illustrative data that may be contained within the data storage component 350 includes, but is not limited to, machine learning model data 352, binning data 354, and/or pack configuration data 356. The machine learning model data 352 may generally pertain to data that is generated by the one or more machine learning servers 150 (FIG. 1) and/or data that is used for the purposes of generating a machine learning model. Still referring to FIG. 3A, the binning data 354 is generally data that is used to assign a classification to each of the cells 220 within a battery pack 200 (FIG. 2), as well as data that is generated as a result of such classification. Still referring to FIG. 3A, the pack configuration data generally contains information pertaining to a particular configuration of a battery pack 200 (FIG. 2) based on information that has been received from the one or more machine learning servers 150 (FIG. 1), data that is generated as a result of operating according to the cell configuration logic 392 and/or the cell categorization logic 394 (FIG. 3B), and/or the like.

It should be understood that the components illustrated in FIGS. 3A-3B are merely illustrative and are not intended to limit the scope of this disclosure. More specifically, while the components in FIGS. 3A-3B are illustrated as residing within the battery configuration system 110, this is a non-limiting example. In some embodiments, one or more of the components may reside external to the battery configuration system 110.

Figure 4:
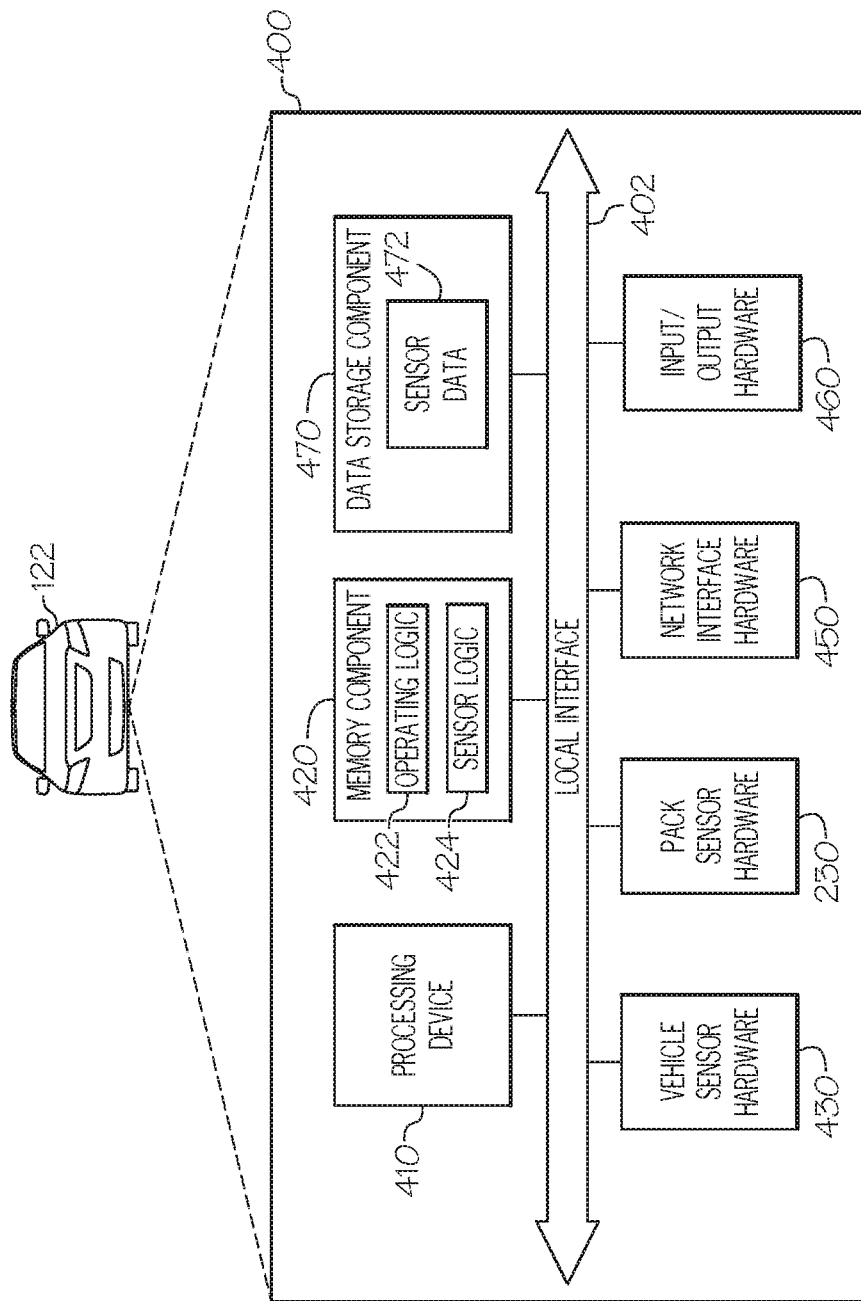
FIG. 4 schematically depicts illustrative hardware components of an illustrative vehicle management module in a vehicle having a battery pack according to one or more embodiments shown and described herein.

FIG. 4 depicts illustrative internal components of a vehicle battery management module 400 within a vehicle 122 in the fleet of vehicles 120 (FIG. 1) according to various embodiments. The vehicle battery management module 400 is generally separate from the BMS hardware components 240 located in the battery pack 200 depicted in FIG. 2, but works in tandem with the BMS hardware components 240 to provide the functionality described herein. As illustrated in FIG. 4, the vehicle battery management module 400 may include a processing device 410, a non-transitory memory component 420, vehicle sensor hardware 430, the pack sensor hardware 230, network interface hardware 450, input/output (I/O) hardware 460, and/or a data storage component 470. A local interface 402, such as a bus or the like (e.g., the vehicle CAN bus), may interconnect the various components.

The processing device 410, such as a computer processing unit (CPU), may be the central processing unit of the vehicle battery management module 400, performing calculations and logic operations to execute a program. The processing device 410, alone or in conjunction with the other components, is an illustrative processing device, computing device, processor, or combination thereof. The processing device 410 may include any processing component configured to receive and execute instructions (such as from the data storage component 470 and/or the memory component 420).

The memory component 420 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 420 may include one or more programming instructions thereon that, when executed by the processing device 410, cause the processing device 410 to complete various processes, such as the processes described herein with respect to FIG. 5.

Still referring to FIG. 4, the programming instructions stored on the memory component 420 may be embodied as a plurality of software logic modules, where each logic module provides programming instructions for completing one or more tasks. Illustrative logic modules depicted in FIG. 4 include, but are not limited to, operating logic 422 and/or sensor logic 424. Each of the logic modules shown in FIG. 4 may be embodied as a computer program, firmware, or hardware, as an example. The operating logic 422 may include an operating system and/or other software for managing components of the vehicle battery management module 400. The sensor logic 424 may include one or more programming instructions for directing operation of the vehicle sensor hardware 430 and/or the pack sensor hardware 230, including, but not limited to, directing the vehicle sensor hardware 430 and/or the pack sensor hardware 230 to sense one or more characteristics of the vehicle 122 and/or the battery pack 200 (FIG. 2), transmit data corresponding to the one or more sensed characteristics, and/or the like.

Still referring to FIG. 4, the vehicle sensor hardware 430 may generally include one or more hardware components that sense one or more vehicle characteristics, particularly characteristics that provide information that can be used to determine a functioning of the battery pack 200 (FIG. 2) and/or complete the various processes described herein. Illustrative hardware components include, but are not limited to, a camera (including video and still cameras), an optical sensor, a ranging system, a time-of-flight (TOF) sensor, a proximity sensor, a temperature sensor, global positioning satellite (GPS) components, electrical sensors (e.g., voltage sensors, impedance sensors, and/or the like), accelerometers, gyroscopes, speed sensors, and/or the like. Other sensors, particularly those used for the purposes of obtaining information relating to battery function, vehicle function, terrain on which the vehicle is driving, and/or the like are also included without departing from the scope of the present disclosure. In some embodiments, the vehicle sensor hardware 430 may receive sensed information and transmit signals and/or data corresponding to the sensed information to one or more components described herein. For example, the vehicle sensor hardware 430 may receive acceleration and/or speed information pertaining to the vehicle and generate one or more signals and/or data to transmit to the processing device 410 for processing the data, transmitting the data to other components, and/or the like, as described in greater detail herein.

The network interface hardware 450 may include any wired or wireless networking hardware, such as a modem, LAN port, wireless fidelity (Wi-Fi) card, WiMax card, mobile communications hardware, and/or other hardware for communicating with other networks and/or devices. For example, the network interface hardware 450 may be used to facilitate communication between the various other components described herein with respect to FIG. 1.

Still referring to FIG. 4, the input/output hardware 460 may communicate information between the local interface 402 and one or more other components of the vehicle 122 not described herein. For example, one or more vehicle components located within the vehicle 122 but not part of the vehicle battery management module 400 may communicate with the various components of the vehicle battery management module 400 via the input/output hardware 460. In some embodiments, the vehicle sensor hardware 430 may be located outside the vehicle battery management module 400 and may communicate (e.g., transmit signals and/or data) with the various components of the vehicle battery management module 400 via the input/output hardware 460.

The data storage component 470, which may generally be a storage medium, may contain one or more data repositories for storing data that is received and/or generated. The data storage component 470 may be any physical storage medium, including, but not limited to, a hard disk drive (HDD), memory, removable storage, and/or the like. While the data storage component 470 is depicted as a local device, it should be understood that the data storage component 470 may be a remote storage device, such as, for example, a server computing device, cloud based storage device, or the like. Illustrative data that may be contained within the data storage component 470 includes, but is not limited to, sensor data 472 and/or other data. The sensor data 472 may generally include data that is obtained from the vehicle sensor hardware 430 and/or the pack sensor hardware 230. Nonlimiting examples of data contained within the sensor data 472 may include vehicle operations data (e.g., accelerometer data, gyroscope data, speed data, GPS data, and/or the like), image data pertaining to an environment in which the vehicle 122 is operating, and battery operations data (e.g., temperature data, voltage data, impedance data, and/or the like).

It should be understood that the components illustrated in FIG. 4 are merely illustrative and are not intended to limit the scope of this disclosure. More specifically, while the components in FIG. 4 are illustrated as residing within the vehicle battery management module 400 within the vehicle 122, this is a nonlimiting example. In some embodiments, one or more of the components may reside external to the vehicle battery management module 400 and/or the vehicle 122.

Figure 5:
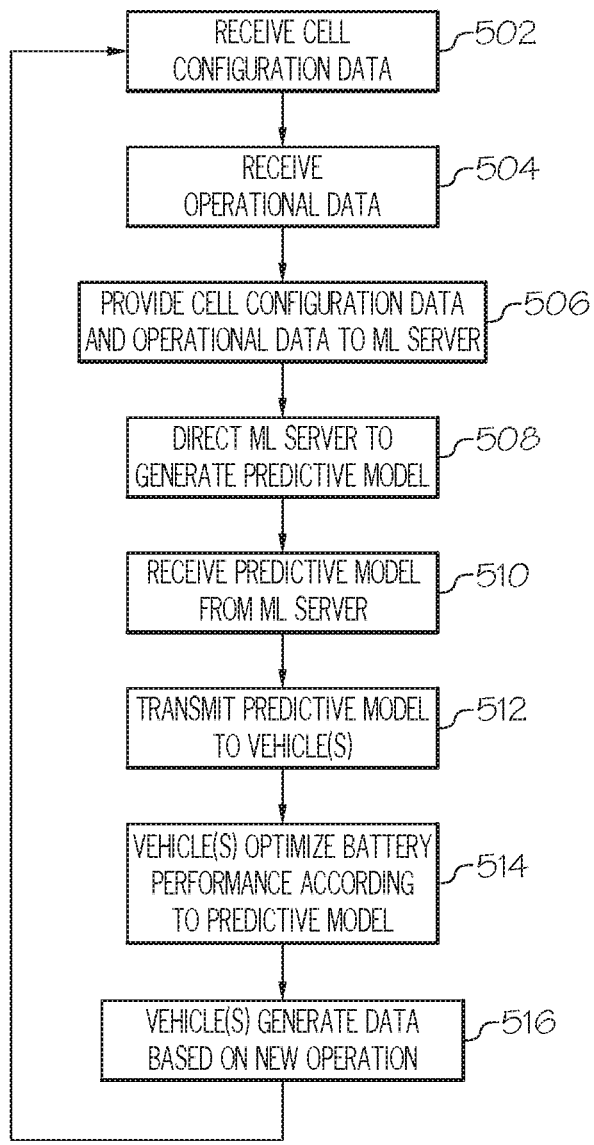
FIG. 5 depicts a flow diagram of an illustrative method of continuously optimizing battery performance using a machine learning model according to one or more embodiments shown and described herein.

As mentioned above, the various components described with respect to FIGS. 1-4 may be used to carry out one or more processes and/or provide functionality for determining optimum battery pack function, generating an ML model that can be used to predict future battery pack functioning in currently used battery packs, transmitting the ML model (or instructions corresponding thereto) to vehicles to update the software contained in the BMS hardware, and receiving additional data from the battery packs as part of a feedback loop. An illustrative example of the various processes are described with respect to FIG. 5 hereinbelow. The various processes described with respect to FIG. 5 may generally be completed by one or more of the components depicted in FIGS. 1-4. FIG. 5 depicts an illustrative method of optimizing battery packs in vehicles according to various embodiments. That is, FIG. 5 generally relates to updating the programming of existing battery packs that are installed and currently in use in vehicles to ensure optimum functionality of the battery pack throughout the lifespan thereof. The various steps described with respect to FIG. 5 are merely illustrative, and additional, fewer, or alternative steps are contemplated without departing from the scope of the present disclosure.

While also generally referring to FIGS. 1-4, at block 502, cell configuration data may be received. That is, the battery configuration system 110 may receive data from the battery pack 200 (e.g., the BMS hardware components 240) that pertains to how the various cells 220 are configured within the modules 210 in the battery pack 200. The cell configuration data generally includes information pertaining to the arrangement of particular cells 220 in a module 210, the arrangement of particular modules 210 in the battery pack 200, the capacity of each cell 220 in a module 210, the capacity of each module 210, the output of each cell 220 in a module 210, the output of each module 210, and/or the like. The cell configuration data is generally usable to determine optimum operation of the battery pack for a particular configuration of cells 220 and modules 210, as described in greater detail herein.

The cell configuration data may generally be received directly from the vehicle 122 containing the battery pack 200 (e.g., via a data connection between the vehicle 122 and the battery configuration system 110) and/or from at least one of the one or more user computing devices 130 and the one or more mobile devices 140 (e.g., when the vehicle 122 is connected to a user computing device 130 or a mobile computing device by the OBD port in the vehicle 122). For example, if the vehicle 122 has a constant data connection, data from the battery pack 200 installed therein may be continuously transmitted according to block 502, or may be transmitted at particular intervals (e.g., hourly, daily, weekly, monthly, or the like). In another example, data from the vehicle 122 may be transmitted when the vehicle is in a technician's shop or other location containing a user computing device 130 or a mobile device 140 that obtains the data from the vehicle and relays the data to the battery configuration system 110. In yet another example, in embodiments where the user computing device 130 or the mobile computing device is a charging station, the data may be offloaded from the vehicle 122 to the battery configuration system 110 when the vehicle is connected to the charging station for charging.

At block 504, operational data may be received. That is, the battery configuration system 110 may receive data from the battery pack 200 (e.g., the BMS hardware components 240) that pertains to how the various cells 220 are operating when the battery pack 200 is used (e.g., charged and discharged). As such, the operational data contains data from various sensors (e.g., the pack sensor hardware 230, the module BMS device 212, and/or the like) that are configured to monitor various electrical characteristics of each of the cells 220, the modules 210, and/or the like. For example, the operational data may include voltage information for each of the modules 210 and/or cells 220 within the battery pack 200, impedance information for each of the modules 210 and/or cells 220 within the battery pack 200, operating temperatures within the battery pack 200, including operating temperatures of various modules 210 and/or cells 220, an amount of time necessary to discharge each module 210 and/or cell 220 in particular operating conditions, an amount of time necessary to charge each module 210 and/or cell 220 in particular operating conditions, and/or the like. In some embodiments, the operational data may be obtained from various ones of the vehicle sensor hardware 430 such that operating conditions of the vehicle 122 can be determined. For example, the data received from the vehicle sensor hardware 430 may be indicative of an environmental temperature outside the vehicle 122, the type of terrain the vehicle 122 is traversing, whether the vehicle 122 is in stop-and-go traffic, the gradation of the road the vehicle 122 is traversing, how fast the vehicle 122 drives, how quickly the vehicle 122 accelerates and/or decelerates, and/or the like. The operational data, in conjunction with the cell configuration data, is generally usable to determine optimum operation of the battery pack for a particular configuration of cells 220 and modules 210, as described in greater detail herein.

The operational data may generally be received directly from the vehicle 122 containing the battery pack 200 (e.g., via a data connection between the vehicle 122 and the battery configuration system 110) and/or from at least one of the one or more user computing devices 130 and the one or more mobile devices 140 (e.g., when the vehicle 122 is connected to a user computing device 130 or a mobile computing device by the OBD port in the vehicle 122). For example, if the vehicle 122 has a constant data connection, data from the battery pack 200 installed therein may be continuously transmitted according to block 502, or may be transmitted at particular intervals (e.g., hourly, daily, weekly, monthly, or the like). In another example, data from the vehicle 122 may be transmitted when the vehicle is in a technician's shop or other location containing a user computing device 130 or a mobile device 140 that obtains the data from the vehicle and relays the data to the battery configuration system 110. In yet another example, in embodiments where the user computing device 130 or the mobile computing device is a charging station, the data may be offloaded from the vehicle 122 to the battery configuration system 110 when the vehicle is connected to the charging station for charging.

It should be understood that in some embodiments, the cell configuration data received according to block 502 and the operational data received according to block 504 may occur substantially simultaneously. That is, the data stream received by the battery configuration system 110 may include both cell configuration data and operational data in some embodiments.

In some embodiments, the cell configuration data received according to block 502 and/or the operational data received according to block 504 may be received from the one or more battery testing devices 160. That is, as a battery testing device 160 tests a connected battery pack 200, the testing data is transmitted to the battery configuration system 110 for use, as described herein. As such, the data that is received according to blocks 502 and 504 may be received from any combination of the vehicles 122 and the one or more battery testing devices 160.

At block 506, the received data (e.g., the cell configuration data and the operational data) is provided to the one or more machine learning servers 150. That is, the data is transmitted by the battery configuration system 110 to at least one of the machine learning servers 150 via the network. Once the machine learning servers 150 receive the data, the machine learning servers 150 may be directed by the battery configuration system 110 to generate a predictive model at block 508. That is, a signal may be transmitted from the battery configuration system 110 to the one or more machine learning servers 150 (e.g., via the network 100) that causes the machine learning servers 150 to feed the received data (e.g., the cell configuration data and the operational data) into a predictive model and/or generate a predictive model from the data. The predictive model may generally be any machine learning model now known or later developed, particularly one that provides resulting information that can be used to determine optimum battery pack configuration for a particular use. Illustrative general examples of machine learning models include, but are not limited to, a convolutional neural network (CNN) model, a long short-term memory (LSTM) model, a neural network (NN) model, a dynamic time warping (DTW) model, or the like. Specific examples include, but are not limited to, descriptor-based models and LFTM models, as described herein. The developed model may be pushed to the battery packs, which then use the model to optimize use of the components within the battery pack 200 (e.g., optimize charging/discharging of particular cells 220, particular modules 210, set a maximum charge percentage, and/or the like), as discussed in greater detail herein.

The predictive model may be transmitted to the battery configuration system 110 for further use as described hereinbelow. In some embodiments, the predictive model may be stored in a battery database or the like such that it can be subsequently retrieved for updating, subsequent use by the battery configuration system 110, accessed by a vehicle 122 from the fleet of vehicles 120, and/or the like. For example, the predictive model may be stored as part of the machine learning model data 352 within the data storage component 350 of the battery configuration system 110.

At block 510, the battery configuration system 110 may receive the predictive model from the one or more machine learning servers 150 (or retrieve the predictive model from data storage) and may transmit the predictive model to one or more vehicles 122 in the fleet of vehicles 120 at block 512. In some embodiments, the predictive model may be transmitted by the one or more machine learning servers 150 directly to the one or more vehicles 122 (thereby bypassing the battery configuration system 110). In other embodiments, the battery configuration system 110 may generate one or more instructions from the predictive model and transmit the one or more instructions to each vehicle 122 for implementation, instead of sending the predictive model to the vehicles 122. That is, the battery configuration system 110 may receive the predictive model, determine particular battery pack configuration parameters (including configuration parameters for each of the cells 220 in the battery pack 200), generate programming instructions that direct each battery pack 200 to update parameters according to the predictive model, and transmit the programming instructions to the vehicles 122.

Accordingly, at block 514, one or more of the vehicles 122 optimize battery performance according to the predictive model. That is, one or more vehicles 122 may receive the predictive model and/or programming instructions, determine from the predictive model what parameters to change to optimize pack performance, and implement the changes accordingly. As described herein, one or more of the battery packs 200 may update the programming in the one or more BMS hardware components 230, update the programming in one or more of the module BMS devices 212, and/or the like such that function of each of the cells 220 in the battery pack 200 is changed according to the predictive model and/or the programming instructions. In some embodiments, the one or more vehicles 122 may optimize the battery performance upon receiving direction to do so from the battery configuration system 110. That is, the battery configuration system 110 may direct each vehicle of the one or more vehicles 122 to optimize performance of its corresponding battery pack 200 according to the predictive model.

For example, if the predictive model indicates that the type of use of the battery pack 200 does not require a full 100% charge (e.g., because the vehicle 122 is typically only driven a few miles a day and a full battery charge is unnecessary), the programming in the one or more BMS hardware components 230, the programming in the one or more module BMS devices 212, and/or the like may be altered such that when the battery pack 200 is plugged in for charging, the state of charge of the battery pack 200 is less than 100% (e.g., 50%, 70%, or the like). As such, when the battery pack 200 is plugged in, the various hardware components thereof prevent a full charge of all of the cells 220 therein to 100%. Rather, the hardware components only allow a portion of the cells 220 to charge to 100% and/or all of the cells 220 to charge to a particular percentage based on the altered state of charge. That is, if the predictive model indicates that the typical use of the battery pack 200 requires only a 70% state of charge, the programming in the one or more BMS hardware components 230, the programming in the one or more module BMS devices 212, and/or the like may be altered such that, when the battery pack 200 is plugged in, the pack as a whole will only charge to 70% capacity. For example, 70% of all cells 220 in the battery pack 200 are charged to 100% and the remaining 30% of the cells 220 are not used, all cells 220 in the battery pack 200 are charged to 70%, or the various cells 220 are each charged to a particular percentage that is optimized for each cell 220 (e.g., based on cell shape, size, location, etc.) and so that the battery pack 200 as a whole is charged to 70%. It should be understood that by altering the state of charge of the battery pack 200 in this manner, the lifetime of the battery pack 200 may be extended without any noticeable change in the day-to-day use of the battery pack 200 (e.g., day-to-day driving).

In another example, if the state of health of the battery pack 200 corresponds to a particular threshold determined from the predictive model that indicates that the battery pack 200 is not performing to particular specifications, the programming in the one or more BMS hardware components 230, the programming in the one or more module BMS devices 212, and/or the like may be altered such that the overall state of health of the battery pack 200 is improved. For example, if it is determined from the data that only a portion of the cells 220 and/or modules 210 are underperforming, failing, or the like within the battery pack 200, thereby affecting the overall state of health of the battery pack 200, the programming in the one or more BMS hardware components 230, the programming in the one or more module BMS devices 212, and/or the like may be altered to deactivate or otherwise repurpose the portion of the cells 220 and/or modules that are underperforming, failing, or the like. As a result of this deactivation or repurposing, the overall state of health of the battery pack 200 may be improved such that it is above the threshold such that the battery pack 200 need not be replaced, repaired, or the like.

While the present disclosure generally relates to battery packs that are already installed in vehicles, it should be understood that the present disclosure is not limited to such. That is, optimization of battery performance according to block 514 may also be completed in newly manufactured batteries so as to ensure that the newly manufactured batteries exhibit optimized performance the first time they are used.

As described herein, the processes create a feedback loop whereby all of the battery packs 200 in the fleet of vehicles 120 are continuously monitored, the predictive model is updated accordingly, and the programming within the battery packs 200 is updated to optimize use accordingly. As such, at block 516, new data is generated based on the updated programming within the battery pack 200 (e.g., new sensor data received from the vehicle sensor hardware 430, from the pack sensor hardware 230, and/or the like). As such, the process returns to block 502 so that the processes according to FIG. 5 can be repeated for the newly generated data. That is, the new data that is generated (e.g., cell configuration data and/or operational data) is transmitted to the battery configuration system 110, which, in turn, transmits the new data to the one or more machine learning servers 150 such that the predictive model can be updated accordingly.

The feedback loop that is created by repeating the processes described with respect to FIG. 5 ensures that the battery packs 200 in existing vehicles, as well as newly installed battery packs 200, are continuously optimized for use, even as the conditions in which the battery packs 200 are used, as the components wear out, and/or the like.

It should now be understood that the systems and methods described herein conduct training and use of an ML model to continuously optimize performance of a battery pack over an entire lifespan of the battery pack (e.g., including assembly, installation in a vehicle, and use in a vehicle). Training and use of a machine learning model generally includes obtaining data pertaining to operation of the cells in battery packs or expected operation. The ML server generates a predictive model that is provided to currently operated vehicles and/or to manufacturing facilities to optimize future performance of the battery pack therein. The process described herein occurs continuously such that a feedback loop is created whereby vehicles are constantly collecting data, determining an optimized pack usage, and updating software to achieve the optimized pack usage.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of optimizing performance of a vehicle battery pack, the method comprising:
    receiving data pertaining to cells within a battery pack installed in each vehicle of a fleet of vehicles, the data received from at least one of each vehicle in the fleet of vehicles;
    providing the data to a machine learning server;
    directing the machine learning server to generate a predictive model based on machine learning of the data;
    providing the predictive model to each vehicle, the predictive model providing instructions for adjusting one or more configuration parameters for each of the cells in the battery pack such that the battery pack is optimized for a particular use; and
    directing each vehicle to optimize performance of the vehicle battery pack based on the predictive model.

2. The method of claim 1, further comprising storing the data and the predictive model in a battery database for subsequent access.

3. The method of claim 1, further comprising receiving test data pertaining to cells within a battery pack tested by a battery testing device.

4. The method of claim 1, further comprising:
    providing the predictive model to a manufacturing facility that manufactures new battery packs; and
    directing the manufacturing facility of optimize performance of the new battery packs based on the predictive model.

5. The method of claim 1, wherein directing each vehicle in the fleet of vehicles to optimize performance of the vehicle battery pack comprises directing each vehicle to alter a state of charge of the vehicle battery pack.

6. The method of claim 1, wherein directing each vehicle in the fleet of vehicles to optimize performance of the vehicle battery pack comprises directing each vehicle to cause a change in a state of health of the vehicle battery pack.

7. The method of claim 1, wherein receiving the data comprises receiving supplemental data from one or more vehicle-specific sensors in each vehicle of the fleet of vehicles.

8. The method of claim 1, wherein directing the machine learning server to generate the predictive model comprises directing the machine learning server to utilize a descriptor based algorithm that analyzes a capacity-voltage curve for individual cell cycles to generate the predictive model.

9. The method of claim 1, wherein directing the machine learning server to generate the predictive model comprises directing the machine learning server to utilize a long short-term memory neural network to generate the predictive model.

10. The method of claim 1, further comprising receiving, by the processing device, new data from each vehicle in the fleet of vehicles, the new data indicating an optimized performance of the vehicle battery pack based on the predictive model.

11. A system configured for optimizing performance of a vehicle battery pack, the system comprising:
    a fleet of vehicles, each vehicle in the fleet of vehicles comprising a battery pack having a plurality of cells; and
    one or more hardware processors communicatively coupled to each vehicle and configured by machine-readable instructions to:
        receive data pertaining to cells within a battery pack installed in each vehicle, the data received from at least one of each vehicle;
        provide the data to a machine learning server;
        direct the machine learning server to generate a predictive model based on machine learning of the data;
        provide the predictive model to each vehicle, the predictive model providing instructions for adjusting one or more configuration parameters for each of the cells in the battery pack such that the battery pack is optimized for a particular use; and
        direct each vehicle to optimize performance of the vehicle battery pack based on the predictive model.

12. The system of claim 11, further comprising a battery database communicatively coupled to the one or more hardware processors, wherein the one or more hardware processors are further configured by machine-readable instructions to store the data and the predictive model in the battery database for subsequent access.

13. The system of claim 11, wherein the one or more hardware processors are further configured by machine-readable instructions to receive test data pertaining to cells within a battery pack tested by a battery testing device.

14. The system of claim 11, wherein directing each vehicle in the fleet of vehicles to optimize performance of the vehicle battery pack comprises directing each vehicle to alter a state of charge of the vehicle battery pack.

15. The system of claim 11, wherein directing each vehicle in the fleet of vehicles to optimize performance of the vehicle battery pack comprises directing each vehicle to cause a change in a state of health of the vehicle battery pack.

16. The system of claim 11, wherein directing the machine learning server to generate the predictive model comprises directing the machine learning server to utilize a descriptor based algorithm that analyzes a capacity-voltage curve for individual cell cycles to generate the predictive model.

17. The system of claim 11, wherein directing the machine learning server to generate the predictive model comprises directing the machine learning server to utilize a long short-term memory neural network to generate the predictive model.

18. The system of claim 11, wherein the one or more hardware processors are further configured by machine-readable instructions to receive new data from each vehicle in the fleet of vehicles, the new data indicating an optimized performance of the vehicle battery pack based on the predictive model.

19. A non-transitory computer-readable storage medium having instructions embodied thereon, the instructions being executable by one or more processors to perform a method for optimizing performance of a vehicle battery pack, the method comprising:
  receiving data pertaining to cells installed in each vehicle of a fleet of vehicles, the data received from at least one of each vehicle;
  providing the data to a machine learning server;
  directing the machine learning server to generate a predictive model based on machine learning of the data;
  providing the predictive model to each vehicle, the predictive model providing instructions for adjusting one or more configuration parameters for each of the cells in the battery pack such that the battery pack is optimized for a particular use; and
  directing each vehicle to optimize performance of the vehicle battery pack based on the predictive model.

20. The computer-readable storage medium of claim 19, wherein directing the machine learning server to generate the predictive model comprises:
  directing the machine learning server to utilize a descriptor based algorithm that analyzes a capacity-voltage curve for individual cell cycles to generate the predictive model; or
  directing the machine learning server to utilize a long short-term memory neural network to generate the predictive model.

* * * * *

UNITED STATES PATENT AND TRADEMARK OFFICE
CERTIFICATE OF CORRECTION

PATENT NO. : 11,065,978 B2
APPLICATION NO. : 16/284515
DATED : July 20, 2021
INVENTOR(S) : Aykol et al.

Page 1 of 1

It is certified that error appears in the above-identified patent and that said Letters Patent is hereby corrected as shown below:

On the Title Page

Column 2, item (56), U.S. patent documents, Line 2, delete "Anderson" and insert --Anderson et al.--, therefor.

In page 2, Column 1, item (56), U.S. patent documents, Line 3, delete "Barfield, Jr." and insert --Barfield, Jr. et al.--, therefor.

In page 2, Column 1, item (56), U.S. patent documents, Line 5, delete "Park" and insert --Park et al.--, therefor.

In page 2, Column 1, item (56), U.S. patent documents, Line 6, delete "Garcia" and insert --Garcia et al.--, therefor.

In page 2, Column 1, item (56), U.S. patent documents, Line 8, delete "Lee" and insert --Lee et al.--, therefor.

In page 2, Column 1, item (56), U.S. patent documents, Line 9, delete "You" and insert --You et al.--, therefor.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*